(12) United States Patent
Gandarillas

(10) Patent No.: US 6,516,508 B1
(45) Date of Patent: Feb. 11, 2003

(54) MAGNETOELASTIC NON-COMPLIANT TORQUE SENSOR AND METHOD OF PRODUCING SAME

(75) Inventor: Carl Gandarillas, Beacon Falls, CT (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 0 days.

(21) Appl. No.: 09/437,932

(22) Filed: Nov. 10, 1999

(51) Int. Cl.[7] .............................. H01F 7/06; G01L 3/10
(52) U.S. Cl. ................... 29/602.1; 73/862.336; 29/623.1; 29/607
(58) Field of Search ...................... 29/602.1, 602.01, 29/603; 73/862.336

(56) References Cited

U.S. PATENT DOCUMENTS

| | | | |
|---|---|---|---|
| 4,760,745 A | 8/1988 | Garshelis | |
| 4,896,544 A | 1/1990 | Garshelis | |
| 4,899,598 A | 2/1990 | Gumaste et al. | |
| 5,351,555 A | 10/1994 | Garshelis | |
| 5,386,733 A | 2/1995 | Hesthamar et al. | |
| 5,465,627 A | 11/1995 | Garshelis | |
| 5,520,059 A | 5/1996 | Garshelis | |
| 5,591,925 A | 1/1997 | Garshelis | |
| 5,706,572 A | * 1/1998 | Garshelis | 29/602.1 |
| 5,706,573 A | * 1/1998 | Garshelis | 29/602.1 |
| 5,708,216 A | 1/1998 | Garshelis | |
| 5,889,215 A | 3/1999 | Kilmartin et al. | |
| 5,907,105 A | * 5/1999 | Pinkerton et al. | 73/862.336 |
| 6,145,387 A | * 11/2000 | Garshelis | 73/862 |
| 6,222,363 B1 | 4/2001 | Cripe | |
| 6,301,976 B1 | 10/2001 | Bogdanov | |
| 6,330,833 B1 | 12/2001 | Opie et al. | |

FOREIGN PATENT DOCUMENTS

EP 0525551 2/1993

* cited by examiner

Primary Examiner—Benjamin R. Fuller
Assistant Examiner—Lilybett Martir

(57) ABSTRACT

A low-hysteresis torque sensor and method for producing a low-hysteresis magnetoelastic element including thermally spraying a magnetoelastic material onto a metal substrate. During the spraying process, axial compressive pressure is applied to the substrate, and subsequently released after the substrate and magnetoelastic element have substantially cooled. This process has the effect of substantially reducing hysteresis and the axial stress in the magnetoelastic element that would normally occur due to the different coefficients of thermal expansion between the magnetoelastic element and the substrate. In a preferred embodiment, the magnetoelastic element includes nickel and the substrate includes stainless steel. It is further preferred that the substrate include a shaft and the magnetoelastic element comprise a circumferential ring intimately attached thereto.

15 Claims, 2 Drawing Sheets

MAGNETOELASTIC NON-COMPLIANT TORQUE SENSOR AND METHOD OF PRODUCING SAME

FIELD OF INVENTION

This invention relates generally to torque sensors, and in particular to non-compliant torque sensors utilizing a magnetoelastic element and a non-contacting magnetometer for sensing magnetic field changes that correspond to changing torque values in a rotatable shaft.

BACKGROUND OF INVENTION

Sensing the torque of rotating shafts is desirable in many applications, such as determining steering wheel effort measurements in electronic power steering systems, determining transmission output torque for electronically controlled shifting, determining power tool output torque, and the like. Torque sensors have been produced in many varieties, and can be generally classified as "compliant" and "non-compliant" torque sensor types. In so-called compliant torque sensors, a sensor, such as a strain gauge, is attached directly to an elastic beam section of a torque-producing shaft. When torque is applied to the elastic beam section, the strain gauge is deflected, which causes a resistance change in the strain gauge. This change of resistance in the strain gauge indicates a change in torque. However, due to the rotating nature of the beam section to which the strain gauge is attached, connecting wires to the strain gauge for transmission of signals is impractical. Thus, the strain gauge type torque sensors require a wireless transmitting device, such as a radio-frequency transmitter, to transmit resistance changes in the strain gauge to a receiver, which interprets these signals as torque values. Alternatively, a signal transference scheme utilizing slip rings, brushes and commutators could be used in a compliant torque sensing system.

However, such compliant torque sensing systems present numerous problems. For instance, because the strain gauges are attached directly to an elastic beam, torque limiters must be included on the rotating shaft to protect the beam and strain gauges from being deflected beyond their elastic range. Unfortunately, such precautions inherently interfere with the transmission of energy through the shaft, and, in the instance of a steering wheel shaft, provide a "soft feel" to the user. Additionally, such torque sensors are of limited reliability due to the direct contact with the rotating shaft, and are very expensive. The strain gauge type torque sensors also require frequent calibration.

To overcome these problems, non-compliant torque sensors were developed, whereby a sensor monitors shaft torque changes in a non-contacting manner, thus obviating the need for torque limiters. Normally, such torque sensors utilize a magnetoelastic element intimately attached to a rotating shaft, whereby the torque sensor would operate on the principle of inverse-magnetostriction.

Magnetostriction is well known and describes a structural property of matter that defines a material's dimensional changes as a result of a changing magnetic field. In essence, magnetostriction is caused when the atoms that constitute a material reorient in order to align their magnetic moments with an external magnetic field. This effect is quantified for a specific material by its saturation magnetostriction constant, which is a value that describes a material's maximum change per unit length.

Contrariwise, inverse-magnetostriction defines changes in a material's magnetic properties in response to applied mechanical forces Torque sensors that utilize inverse-magnetostriction operate on the premise that stresses and strains that are transmitted through the rotating shaft to the magnetoelastic element by the application of torque cause measurable changes in the magnetic field of the magnetoelastic element. Thus, the magnetic field strength produced from the magnetoelastic element is a direct function of the magnitude of the torque applied. A torque sensor utilizing such a magnetoelastic element would also have a magnetometer that would translate the magnetic field strength emanating from the magnetoelastic element into an analog voltage signal, thereby performing a torque to voltage transducer function. It is known in non-compliant torque sensors to attach a ring of magnetoelastic material to a rotating shaft via interference fitting means, such as a pressure fit or shrink fit, inter-engaging means such as mating splines or teeth, chemical means such as the use of an adhesive, thermal means such as thermal spraying, or any other type of attaching means as are known in the art. In practice, under any of the above attaching methods, the attachment of the magnetoelastic element to the shaft has proven to be of the utmost importance. Indeed, defects in the boundary between the magnetoelastic element and the torque carrying member will result in aberrant coupling of stress and strains into the magnetic element, which adversely affect torque measurements. Boundary defects can include imperfections such as voids, contaminates, and lateral shearing.

Further, practical requirements for torque sensors include design tolerance limits on the accuracy and linearity of the in-range voltage output and the amount of hysteresis, also known as "zero shift," after a "yield torque" or "over-torque" is applied to the shaft. Such "over-torque" conditions can exist, for example, in steering systems during curb push-away situations, and can be experienced in transmission applications during drastic torque reversals. Hysteresis may occur because after the over torque condition is relaxed, the resulting breakdown or slippage at the shaft/magnetoelastic element interface causes a mechanical bias in the magnetoelastic element. Consequently, a corresponding magnetic bias is produced, thereby negatively affecting future torque measurements. Further, if the breakdown of the shaft/magnetoelastic element interface is localized, the result may be a magnetic incongruity that manifests as a variance in torque measurements with respect to the angular position of the shaft. While such breakdown between the shaft and magnetoelastic element is normally not a problem where the magnetoelastic element is thermally sprayed, hysteresis still occurs in thermal sprayed magnetoelastic elements due to the different coefficients of thermal expansion between the shaft and magnetoelastic element, as will be explained in more detail herein.

For example, in an automotive steering column torque sensor, it is preferred that there be a full range torque measurement of +/− 6 ft-lb, and a hysteresis requirement +/− 1.5% of full scale after application of a 100 ft-lb yield torque. However, present thermal sprayed magnetic elements will exhibit hysteresis well over the acceptable limits even when a yield torque of only 15 ft-lb. is applied.

Thus, there is a need for a torque sensor that will exhibit low hysteresis after a yield torque is applied. Further, there is a need for a method of producing such a low hysteresis torque sensor.

Other needs will become apparent upon a further reading of the following detailed description taken in conjunction with the drawings.

SUMMARY OF THE INVENTION

In one form of the invention, the aforementioned needs are fulfilled by a low hysteresis torque sensor and method for producing a low-hysteresis magnetoelastic element comprising thermally spraying a magnetoelastic material onto a metal substrate. During the spraying process, compressive axial pressure is applied to the substrate, and subsequently released after the substrate and magnetoelastic element have substantially cooled. This process has the effect of substantially reducing hysteresis and the axial stress in the magnetoelastic element that would normally occur due to the different coefficients of thermal expansion between the magnetoelastic element and the substrate. In a preferred embodiment, the magnetoelastic element comprises nickel and the substrate comprises stainless steel. It is further preferred that the substrate comprise a shaft and the magnetoelastic element comprise a circumferential ring intimately attached thereto.

DETAILED DESCRIPTION OF THE PREFERRED EMBODIMENT

Figure 1:
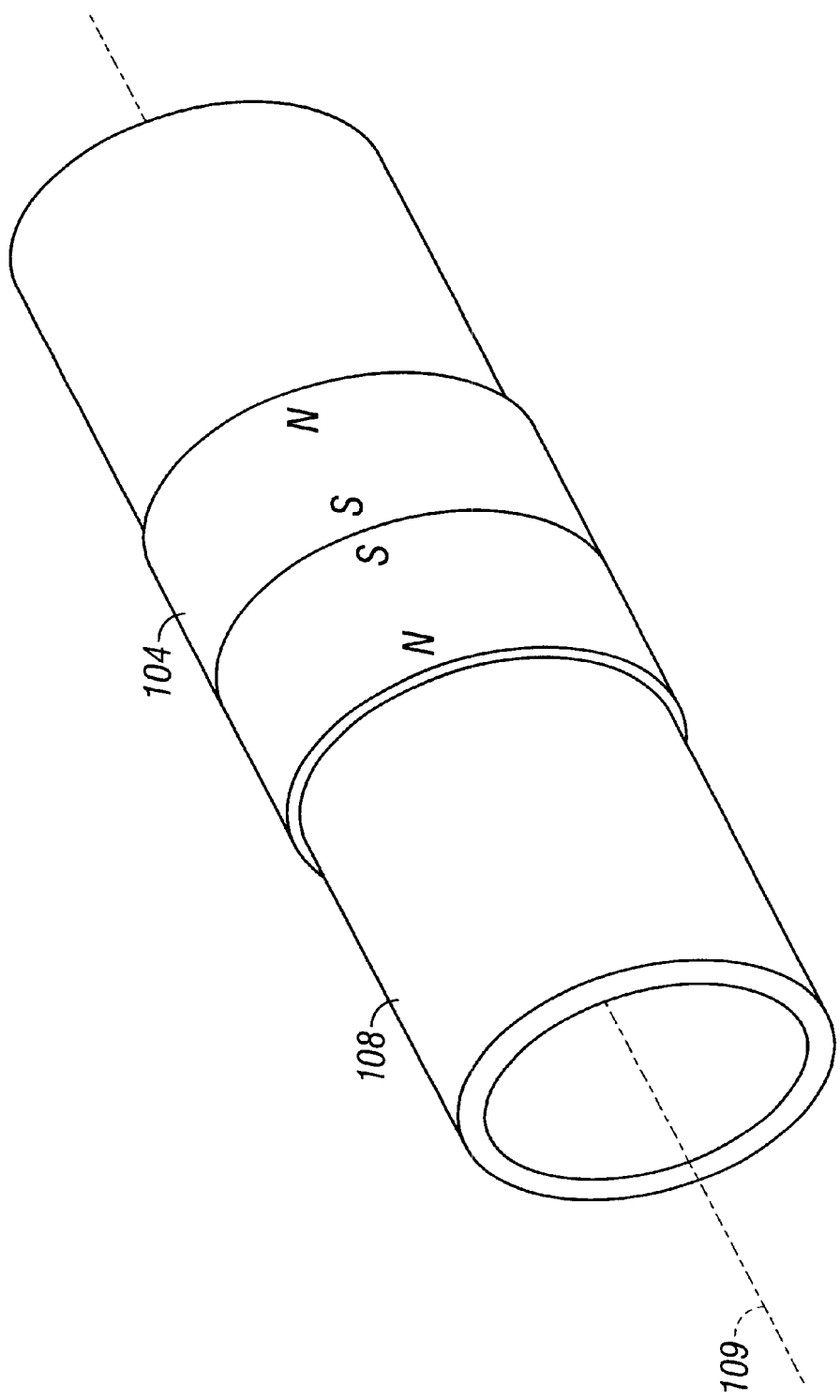
FIG. 1 is a perspective view of a torque producing shaft with a magnetoelastic element attached thereto.

While the present invention is capable of embodiment in various forms, there is shown in the drawings and will be hereinafter described a presently preferred embodiment with the understanding that the present disclosure is to be considered as an exemplification of the invention, and is not intended to limit the invention to the specific embodiment illustrated.

Figures 2, 3, 4:
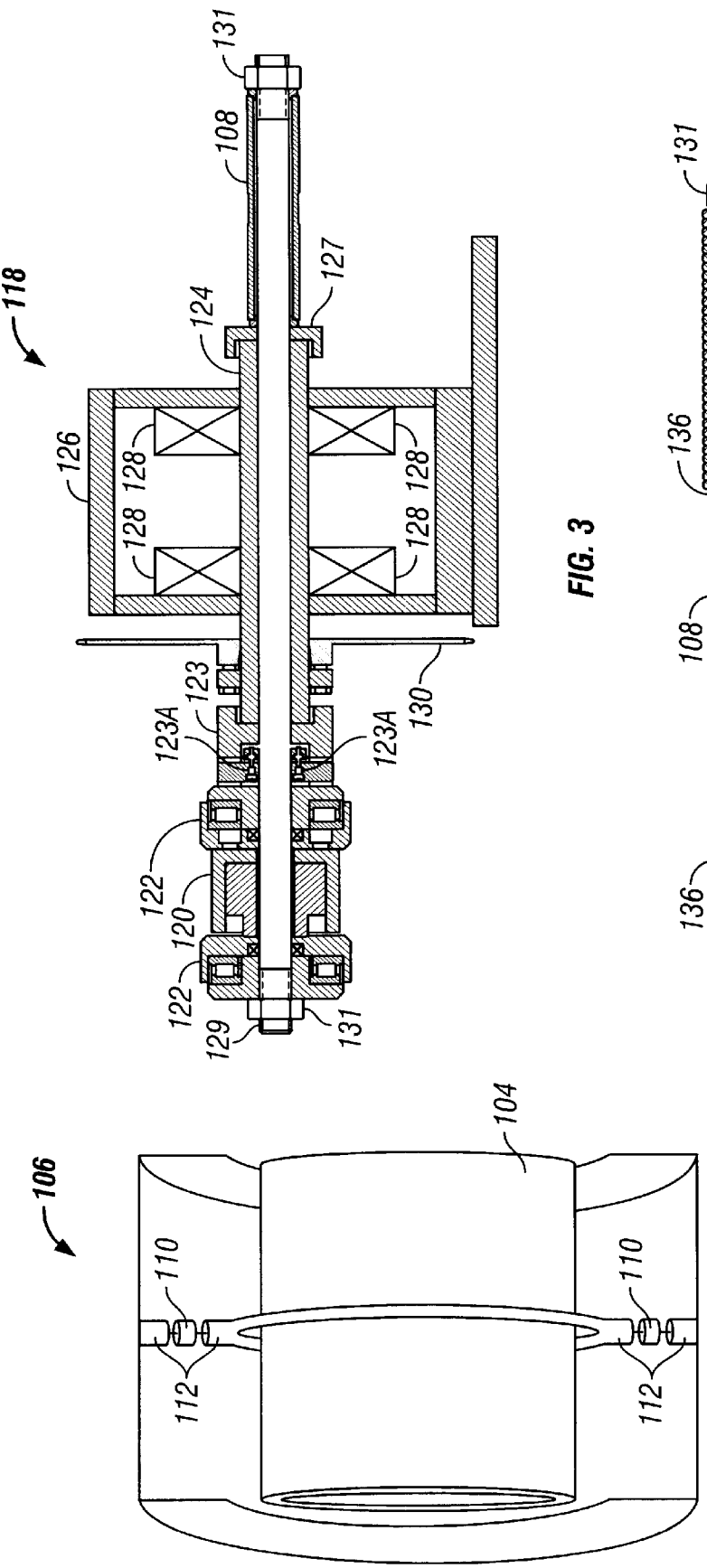
FIG. 2 is a partial perspective view of a magnetometer surrounding a magnetoelastic element.
FIG. 3 is a cross-sectional view of a hydraulic assembly.
FIG. 4 is a cross-sectional view of a bolt and spring assembly.

With reference to FIGS. 1 and 2, the torque sensor according to the present invention generally comprises a magnetoelastic element 104 and a magnetometer 106. Magnetoelastic element 104 is fixedly attached to a non-magnetic shaft 108, which is rotatable about a longitudinal axis 109. Non-magnetic shaft 108 preferably comprises stainless steel, and most preferably Nitronic® 50 stainless steel. Further, it is preferable that magnetoelastic element comprise a 99.9% pure nickel content powdered metal that is attached to shaft 108 via a thermal spraying process. It will be understood, however, that the shaft 108 may comprise any other non-magnetic material, such as aluminum, that has a higher coefficient of thermal expansion than a magnetoelastic element. Further, the magnetoelastic element 104 may comprise any other material that has a negative coefficient of magnetostriction and has a lower coefficient of thermal expansion than the substrate to which it is applied.

As described above, it is crucial that an intimate bond be formed between the magnetoelastic element 104 and the shaft 108. Out of the attaching means described above, the thermal spraying process is the preferred attaching means due its high bond strength and amenability to the high volume demands of the automotive marketplace. The thermal spray process utilized to deposit the magnetoelastic element 104 fuses the magnetoelastic element 104 to the underlying shaft 108 and creates a gradation at the substrate/coating interface boundary. This provides an intimate bond between the magnetoelastic element 104 and the underlying shaft 108 that is capable of surviving extreme torque levels that are well outside a full-scale measurement region. Indeed, it is known that thermal sprayed coatings have typical bond strengths on the order of 10,000 psi or greater.

As is known in the art, to effectively invoke the inverse magnetostrictive effect in a magnetoelastic element, the magnetoelastic element must be pre-loaded with stress anisotropy in its quiescent state. In the case of a pressure-fit magnetoelastic element, this is accomplished through the pressure fit process, i.e., when the magnetoelastic element is fit over a shaft, compressive and tensile forces are formed therein. However, in contrast to the pressure fit magnetoelastic element, the thermal sprayed magnetoelastic element 104 of the present invention is pre-loaded with stress through the differential in thermal expansion between the nickel magnetoelastic element 104 and the stainless steel shaft 108. For example, at a processing temperature of 930° F., the coefficient of linear thermal expansion of nickel is $8.4 \times 10^{-6}$ °F$^{-1}$. and that of stainless steel is $10.1 \times 10^{-6}$ °F$^{-1}$. Thus, as the two materials cool in the joined condition, the stainless steel shaft creates compressive stresses in the outer nickel magnetoelastic element. This is an isotropic process; compression is set up in nickel not only in the desired tangential direction (which is used for sensor output), but also to a certain extent in the axial direction. The radial component, however, is tensile. It is the axial compressive stress component of the nickel magnetoelastic element that has been found to contribute to hysteresis. In particular, it was found that the thermal spraying process leaves an "axial magnet" in the magnetoelastic element, which lies dormant until enough torque is applied to charge the "axial magnet." Thus, as the principal stress vector (in the tangential direction) tips toward the axial direction with increasing torque loads, eventually a torque level is reached which causes a permanent axial magnetic charge, thus causing hysteresis (or "zero shift") in the magnetoelastic element. The net effect upon sensor output is that the sensor will indicate that some amount of torque is still being applied, even though it is not. Indeed, prior thermal sprayed torque sensors could withstand only 15 ft-lb. before severe hysteresis would occur.

In order to overcome this problem, the current invention contemplates applying a compressive axial load to the shaft 108 as the powdered nickel is thermally sprayed onto the shaft 108. Subsequently, the compressive axial load is removed after spraying is completed and the shaft has cooled to approximately 200° F. This process has the effect of substantially reducing or eliminating the axial compressive stress created by the different thermal expansion coefficients between the sprayed magnetoelastic element 104 and the shaft 108, and thus substantially prevents hysteresis upon application of a yield torque because there will no longer be any substantial dormant "axial magnet" in the magnetoelastic element. In particular, by applying an axial load to the shaft 108 during the production of the magnetoelastic element 104, the excess thermal expansion of the shaft material may be reduced or eliminated and, upon cooling to room temperature, the axial stress between the shaft 108 and magnetoelastic element 104 is minimized. Advantageously, the major compressive stress, which is used for sensor readings, remains in a tangential direction after application of the above process. Thus, through the above process, a magnetoelastic element is produced that will exhibit levels of hysteresis well within preferred limits upon an application of a yield torque, which results in consistently accurate torque measurements. It will be understood that although thermal spraying is discussed herein, the present invention is capable of being applied to a variety of attaching means, including, but not limited to, welding, plating, physical vapor deposition and chemical vapor deposition.

In order to determine the proper amount of axial compressive stress to apply to the shaft during the formation of the magnetoelastic element 104, the following formula is utilized:

$$\sigma_s = E_s \cdot \Delta T \cdot (\alpha_s - \alpha_{r0})$$

Where:
- $\sigma_s$=the compressive stress to apply to the substrate (i.e., the shaft 108)
- $E_s$=the elastic modulus of the substrate;
- $\Delta T$=the processing temperature of the thermal spray—the ambient room temperature;
- $\alpha_s$=the substrate's linear coefficient of thermal expansion; and
- $\alpha_r$=the magnetoelastic ring's linear coefficient of thermal expansion.

Preferably, the apparatus to form the magnetoelastic ring 104 on the shaft 108 comprises the hydraulic apparatus substantially shown in FIG. 3, and generally designated as reference numeral 118. Hydraulic apparatus 118 comprises a hollow hydraulic cylinder 120, preferably having an effective cylinder area of 2.77 in$^2$, held stationary between two roller thrust bearing assemblies 122, which preferably have a load rating of at least 8 tons. A spindle 124 extends through a main bearing housing 126, which contains bearings 128. The spindle 124 terminates on one end with a centering end cap 127, and is driven by an electric motor (not shown) that engages with drive sprocket 130. The drive sprocket 130 is in turn intimately attached to spindle 124 for conjoint rotation therewith. The hydraulic cylinder 120 is held stationary by a torque arm (not shown) and applies force between the two thrust bearing assemblies 122, which is transmitted to the shaft 108 through the axle 129 and nuts 131. Thus, hydraulic apparatus 118 allows the spindle 124 and shaft 108 to rotate while being subjected to a load which may be varied by controlling the hydraulic pressure delivered to the hydraulic cylinder 120. This technique has produced the most consistent results to date due to the system pressure being maintained by the use of a hydraulic accumulator (not shown), so that the increase of the shaft length, which acts upon the hydraulic cylinder during thermal spraying, has a minimal effect on the force applied.

Preferably, a lockout device 123 is used to prevent any torque resulting from load on the thrust bearings 122 from being transmitted to the shaft 108. In essence, the lockout device 123 couples the axle 129 to the spindle 124 for conjoint rotation therewith. The lockout device 123 is preferably connected to the spindle 124 via mating splines and grooves, and is connected to axle 129 via clamps 123A. However, it should be noted that the lockout device 123 may be attached to the axle 129 and spindle 124 by any other securing means, such as set screws, clamps, or the like, as are well known in the art. Further, it is preferred that aluminum cooling blocks (not shown) surround the thrust bearing assemblies 122, which are fed with chilled water to prevent excessive heat rise. Another way of preventing excessive heating of the thrust bearing assemblies 122 is an oil circulation system (not shown), which includes a heat exchanger (not shown) to cool the circulating oil.

Alternatively, the requisite load applied to the sensor shaft 108 may be accomplished by utilizing a through bolt 132 and nut 131, a belleville spring stack 134, and washers 136 as shown in FIG. 4. By tightening the bolt 132 to a given torque an initial load is applied to the shaft 108. As the shaft 108 grows in length with temperature, additional compression of the springs brings the load to a higher, final value. Although low hysteresis shafts were made using this technique, it was found to be unreliable for two reasons: the lack of a predictable force level generated from torque applied to the bolt 132, and the lack of precise knowledge of the thermal growth of the heated stainless steel shaft 108. The advantages of this method are that no torque is applied to the shaft 108 during the spraying process, and that the springs 134 apply a load that increases with increasing temperature, thereby providing a self-compensating effect. However, it is preferred to use the hydraulic apparatus method described above for purposes of this invention.

Preferably, after the magnetoelastic ring 104 is attached to the shaft 108, it is charged on a magnetizing fixture (not shown), which creates counter-opposing magnetic fields, as shown in FIG. 1. Thus, one-half of the ring is circumferentially charged in a clockwise direction, while the other half is circumferentially charged in a counter clockwise direction. This charging technique is used to provide immunity from stray magnetic fields that would normally interfere with the sensing capacity of the magnetometer 106. However, it should be noted that the current invention is applicable to a unidirectionally magnetized ring, or any number of contiguous oppositely magnetized sections of a magnetoelastic ring.

An example of the aforementioned process will now be detailed for thermally spraying a magnetoelastic element comprising 270/D size nickel power onto a stainless steel shaft. It should be noted that the following specific example is provided to illustrate further aspects and unique advantages of the present invention, and other features and embodiments should become apparent to those skilled in the art. The example is set forth for illustration only, and should not be construed as a limitation on the scope of the present invention.

Thermal spraying of 270/D size, nickel powder onto a stainless steel shaft having an outer diameter of 0.950 inches and inner diameter of 0.718 is accomplished by utilizing a high velocity oxygen fuel (HVOF) gun, having a kerosene fuel flow of 5.1 GPH and an oxygen gas flow of 1800 SCFH. It is preferred to preheat the substrate to processing temperature before spraying starts and provide a consistent temperature during the spray process. The distance from the gun outlet to the shaft 108 is 14 inches, resulting in an average particle velocity of 2200 ft/sec. The process pressure used is 3600 psi and the process temperature is 930° F. These process parameters require a 4.9 ton axial load on the shaft 108, which is calculated using the aforementioned formula. Preferably, the shaft 108 rotation speed is 300 rpm. When the thermal spraying is completed and the shaft 108 has cooled to approximately 200° F., the axial load is removed.

After the magnetoelastic ring 104 is attached to the shaft 108 and magnetically charged by the foregoing method, an annular magnetometer is assembled around the magnetoelastic ring 104 in a non-contacting manner, as shown in FIG. 2 with half of the magnetometer 106 casing removed. The magnetometer 106 has the purpose of translating the magnetic signal emitted by the magnetoelastic element 104 into an electrical signal that can be read by system-level devices. As described above, due to the inverse-magnetostrictive effect of the magnetoelastic material, the polarity and magnitude of the radially directed magnetic flux found at the circumferential centerline of the magnetoelastic element are related directly to torque. Preferably, the magnetometer 106 is rigidly attached to a static element (not shown) proximate the shaft 108, such as an automobile chassis frame in the case of the torque sensor being used to detect torque on a drive shaft, steering column, or the like.

The magnetometer 106 used in the present invention is preferably constructed of a ferromagnetic material such as mild steel, and preferably utilizes flux gate magnetometry, also known as saturable-core magnetometry, which is well known to those skilled in the art. This preferred magnetometer design is substantially described in U.S. Pat. No. 5,889,215, which is hereby incorporated by reference.

Essentially, flux gate magnetometers operate on the premise that in the absence of an external magnetic field, a reference signal can be established by periodically bringing a piece of high permeability magnetic material in and out of magnetic saturation by an AC inductance pulse. Any time shift in the reference signal caused by an outside source, such as the magnetoelastic element 104, can be measured and translated into an absolute magnetic field strength of the outside source.

Although many flux gate designs have used separate drive and pickup coils, it is preferable for purposes of the present invention that the magnetometer 106 (FIG. 2) contain only one coil for both functions, as is known in the art. Further, it is preferable that the magnetometer 106 contain at least two drive/pickup coils 110, hereinafter referred to as flux gates 110.

To improve performance of the magnetometer, flux guides 112 are provided in the magnetometer 106, and are attached to the flux gates 110 . The flux guides 112 amplify and focus the magnetic signal radiating from the magnetoelastic element 104 prior to detection by the flux gates 1 10, thereby improving the signal to noise ratio. Further, the flux guides 112 provide additional signal conditioning by substantially removing irregularities in the magnetic signal from the magnetoelastic element 104. This is accomplished due to the flux guide 112 collecting magnetic flux over a large angular distance.

To further improve the magnetometer's resistance to stray signals present in the environment, also known as common mode noise, common-mode rejection schemes are employed in the design of the electronic and magnetic circuits in the magnetometer, as well as the structure of the magnetometer itself. For example, wherever possible, differential circuitry, as is known in the art, is used in the electronic design in order to negate common-mode noise. This effect is duplicated in the magnetometer design through the use of symmetrically shaped flux guides 112 and symmetrically placed flux gates 110, which are preferably separated by 180 degrees.

Finally, to augment the electrical and magnetic common-mode rejection strategies, EMI and magnetic shielding structures are incorporated into the magnetometer design, as are well known in the art. Thus, by utilizing the aforementioned common mode rejection schemes and shielding, stray magnetic and electromagnetic signals found in the environment are substantially prevented from interfering with the flux gates 110 and the magnetoelastic element 104.

As those skilled in the art will readily understand, the non-compliant torque sensor of the present invention can be used on a variety of applications, including, but not limited to, steering wheel effort measurements in electronic power steering systems, determination of transmission output torque for electronically controlled shifting, cam and crankshaft torque measurements for engine misfire detection, antilock brake system wheel torque measurements, vehicle suspension measurements for active ride compensation, and brake pedal torque measurements for electric breaking.

The foregoing description of a preferred embodiment of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined by the claims set forth below.

What is claimed is:

1. A method for forming a magnetoelastic element on a substrate comprising the steps of:
   (a) applying axial stress to said substrate;
   (b) applying a magnetoelastic element onto said substrate; and
   (c) releasing said axial stress from said substrate, said substrate being a shaft, said axial stress being applied to said shaft by placing a load on axial opposite ends portions of said shaft, and said axial stress being released from said shaft by releasing said load on axial opposite end portions of said shaft.

2. The method according to claim 1, wherein said substrate is a shaft.

3. The method according to claim 2, wherein said shaft comprises stainless steel.

4. The method according to claim 1, wherein said magnetoelastic element is ring shaped.

5. The method according to claim 4, wherein said magnetoelastic element comprises nickel.

6. The method according to claim 1, wherein said substrate and said magnetoelastic element have different coefficients of thermal expansion.

7. The method according to claim 6, wherein said substrate comprises stainless steel, and said magnetoelastic element comprises nickel.

8. The method according to claim 1, wherein said stress is an axial compressive stress.

9. The method according to claim 1, wherein said magnetoelastic element is applied to said substrate by thermal spraying.

10. The method according to claim 9, wherein said releasing occurs after the substrate has cooled to 200° F.

11. The method according to claim 1, wherein said magnetoelastic element comprises a negative magnetoelastic material.

12. The method according to claim 11, wherein said magnetoelastic material is nickel.

13. A method for forming a magnetoelastic element on a shaft comprising the steps of:
   (a) applying axial compressive stress to said shaft;
   (b) thermal spraying a ring-shaped magnetoelastic element comprising nickel onto said shaft; and
   (c) releasing said axial compressive stress from said shaft.

14. The method according to claim 13, wherein said releasing occurs after the shaft has cooled to 200° F.

15. The method according to claim 13, wherein said axial compressive stress is applied to said shaft by placing a load on axial opposite end portions of said shaft, and said axial compressive stress is released from said shaft by releasing said load on axial opposite end portions of said shalt.

* * * * *